(No Model.)
T. E. WARD.
SIGNAL.
No. 551,660. Patented Dec. 17, 1895.
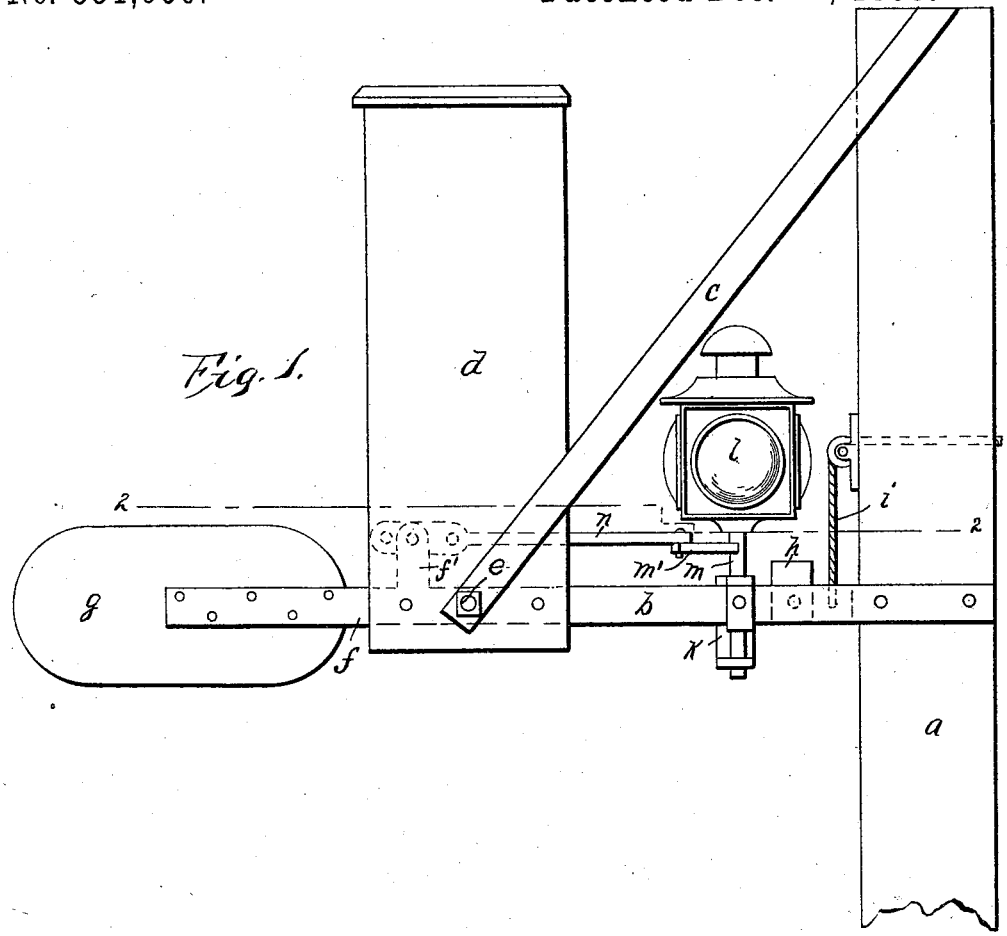
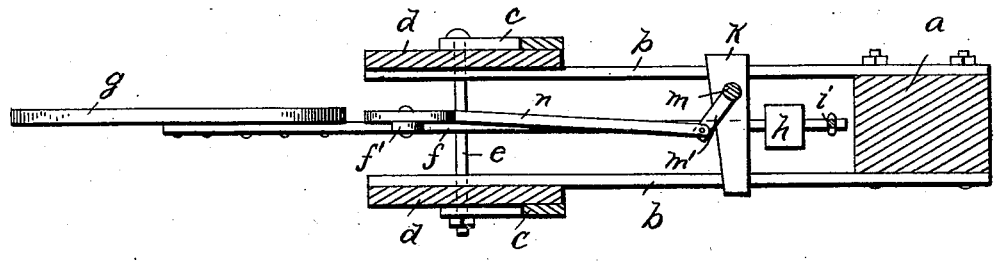
Witnesses:
E. Callan Duffy
Chas. M. Werle
Inventor
Thos. E. Ward
per J. E. Duffy
Attorney

UNITED STATES PATENT OFFICE.

THOMAS E. WARD, OF MARSHALL, TEXAS.

SIGNAL.

SPECIFICATION forming part of Letters Patent No. 551,660, dated December 17, 1895.

Application filed August 1, 1895. Serial No. 557,910. (No model.)

*To all whom it may concern:*

Be it known that I, THOMAS E. WARD, of Marshall, in the county of Harrison and State of Texas, have invented certain new and useful Improvements in Signals; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in railroad-signals.

The object of the invention is to provide an improved railroad-signal wherein the light or night-signal moves automatically with the semaphore in an improved, simple and efficient manner.

The invention consists in certain novel features of construction and in combinations and arrangements of parts more fully and particularly pointed out and described hereinafter.

Referring to the accompanying drawings, Figure 1 is a side elevation of a construction embodying my invention. Fig. 2 is a section on the line 2 2, Fig. 1.

In the drawings, $a$ is a vertical supporting-post suitably arranged beside or adjacent to a railroad-track. A lateral supporting-bracket is secured to and extends from the upper part of this support. This bracket can, if desired, be formed of the two separated horizontal strips or arms $b\,b$, secured to opposite sides of the support $a$ and extending outwardly therefrom. These arms can be properly strengthened and secured by the braces $c\,c$. The shield $d$ is arranged vertically at the outer ends of the arms and can be composed of two vertical plates or boards with the space between them. A horizontal bolt or shaft $e$ is arranged in the bracket between the outer ends of the arms $b\,b$ and across the lower end of the space within the shield. A semaphore arm or lever $f$ is fulcrumed between its ends on this shaft $e$ and carries the semaphore $g$ at its outer end, so that when the lever is in horizontal position, as shown in Fig. 1, the semaphore is displayed and extends outwardly in continuation of the arms $b\,b$. When the lever is in vertical position, its upper end carrying the semaphore swings up within the shield and thereby conceals the semaphore, which is thus thrown from operative position. The semaphore-lever extends inwardly from its fulcrum and is usually counterweighted (see $h$) at its inner end, and the operating connection $i$ from the operator's stand or other point is attached to this inner end, so that the semaphore can be easily swung from its horizontal displayed position to its vertical concealed position.

$k$ is an adjustable cross bar or frame on and extending between the arms $b\,b$ of the bracket.

$l$ is a lantern having differently-colored glasses or lenses in the sides thereof (usually white and red in opposite sides) and provided with and supported by a depending stem $m$, supported and journaled to turn in the frame $k$. This stem has a lateral arm $m'$ and the semaphore-lever has an upwardly-extending arm $f'$ at its fulcrum, and a loose link $n$ joins these two arms $m'$ and $f'$, so that the lamp or light is turned automatically with the semaphore either to the inoperative or "safe" position or the displayed or signaling position. The link $n$ can have a series of pin-holes therein, so that the connection can be adjusted.

It is evident that various slight changes might be made in the form, construction, and arrangement of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. A support, as a vertical post, in combination with a bracket extending horizontally therefrom, a vertical shield carried by the bracket, a vertically swinging counterweighted lever fulcrumed between its ends in the bracket and carrying a semaphore at its outer end arranged to move up within the shield when the lever is in the vertical position, and to drop down beyond the exterior of the shield when the lever is horizontal within the bracket, and operating connections for the lever, a turnable lamp mounted on the bracket between the shield and support and connected with and operated by said lever, substantially as described.

2. In combination, a support, a lateral bracket having a shield, a vertically swinging lever fulcrumed at the shield and having a semaphore at the outer end, an arm extending up from its pivot, an operating connection for the lever, a support longitudinally adjustable on the bracket, a vertical pivot mounted to turn in said support and carrying a lamp, a lateral arm therefrom, and a link connecting said lateral arms, substantially as described.

In testimony that I claim the foregoing as my own I affix my signature in presence of two witnesses.

THOMAS E. WARD.

Witnesses:
T. H. LANGLEY,
J. G. WALKER.